Sept. 24, 1968    J. BOLLITO ET AL    3,402,624
CHAMFERING TOOLS
Filed Sept. 11, 1967

INVENTORS
JACK BOLLITO
JOESEPH HEINLEIN
CHARLES DEMMETT

ATTORNEY

United States Patent Office 3,402,624
Patented Sept. 24, 1968

3,402,624
CHAMFERING TOOLS
Jack Bollito, Oak Lawn, Joseph Heinlein, Oak Forest, and Charles R. Demmett, Lyle, Ill., assignors to J & J Tool Co., Chamfering Division, a partnership
Filed Sept. 11, 1967, Ser. No. 666,847
8 Claims. (Cl. 77—73)

ABSTRACT OF THE DISCLOSURE

A deburring tool having three cutting edges integrally combined for simultaneously reaming, finish cutting, and deburring pipe, tube or conduit stock.

---

Figure 2:
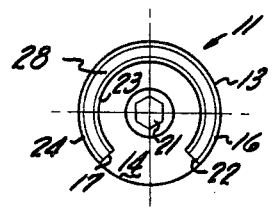

This invention relates to chamfering tools and more particularly to chamfering tools used for removing the burrs left on the cut ends of pipes, tubes or conduit when they are cut to size.

In the not very distant past, piping, tubing, and conduit were cut to size by hand. Then, the craftsman using means, such as a hacksaw would cut the pipes, tubing or conduit to a required length. The hacksaw of course, leaves the cut end of the pipe tubing or conduit with clearly discernible interior and exterior burrs. In addition, the face of the end of the pipe, tubing or conduit is also left rough and ragged by either the hacksaw or any of the well known types of pipe cutters.

The burrs and ragged edges are of course, detrimental to the purposes for which the pipe, tubing or conduit is used. For example, if the cut articles are used for conduit then the burr or ragged edge may easily damage the insulation on wires when the wires are pulled through the conduit.

Similarly, the burrs or rough edges contribute pressure drop to any fluid system which in summation could prove significant. Also, in high pressure systems, the ragged face of the pipe or tubing in combination with the outer burr could enable leakage at the joints.

Accordingly, the craftsman after cutting the pipe, tubing or conduit would, almost automatically ream the portion to be used to remove the inside burr. The outside burr would be removed by sanding or with a file. The face would be smoothed using the file. Thus, after cuttting the piping, tubing or conduit, the cut edge would always be "dressed."

Now the majority of piping, tubing and conduit is pre-cut to desired lengths at a machine shop. Machines are, of course, utilized for the process. After being cut, the articles are taken to another machine or further machined in place where the cut edges are automatically "dressed."

The dressing or deburring operation is presently accomplished using three separate tools. One of the tools removes the inner burr left by the cutting tool, one faces and the other removes the outer burr. Alternatively, tools using a plurality of insertable blades are available for accomplishing dressing and the burring operations.

The dressing operations may be accomplished sequentially or simultaneously. If they are accomplished separately, then, of course, the dressing operation is almost thrice as time consuming. If they are accomplished simultaneously, then a master machinist is required to properly center and align the plurality of dressing tools in the arbor or turret tool holder. The operation of the machine that accomplishes the cutting and dressing does not, per se, require a machinist. The set up operation must be exact or many sections of pipe, tubing, or conduit would be ruined. For example, if the chamfering tool was not properly centered, the resulting finished pipe, tubing or conduit would be spoiled. That is, one of the walls could be ruptured by the off-centered chamfering tools. Therefore, whenever setting up the plurality of tools in the turret or arbor, a skilled machinist is required. The technician or machine operator cannot as a rule, perform his job until this machinist has set it up. The set up is necessary at the initiation of the run and also whenever any of the tools has to be sharpened. A skilled machinist is also required for sharpening presently used tools. Thus, the present tooling requires highly skilled machinists and results in an inordinate amount of down time.

When the insertable blade tools are used, down time is increased since the blades must be replaced whenever any one of the plurality of blades becomes dulled or chipped. In many cases, the tool must be removed from the tool machine and then the blades must be removed from the tool. In addition, the blades themselves are not amenable to a relatively simple sharpening operation.

Accordingly, it is an object of the present invention to provide new and unique means for "dressing" cut pipe, tubing or conduit.

A related object of the present invention is to provide a single tool which simultaneously chamfers, deburs, and faces cut piping, tubing or conduit.

A further object of the present invention is to provide tooling for "dressing" cut piping, tubing, or conduit, which can be set up by the usual operator and does not require the services of a skilled machinist.

A further related object of the present invention is to provide deburring and facing tooling for use in chamfering and facing cut piping, tubing or conduit, which tooling is amenable to proper positioning and centering in the mandril or holding block of the drive tool and which tooling can be easily removed from the mandril reepatedly, sharpened and replaced with only insignificant down time. It is not necessary to replace blades, a simple grinding operation resharpens the tool.

According to one embodiment of the present invention, the inventive chamfering tool comprises a shank portion, and a main body portion. The shank portion may have an outside thread to facilitate securing it to a holding block or arbor. The main body position is equipped with a cutting section positioned to generate a circle having the diameter of the piping, tubing or conduit to be "dressed," when the tool rotates on its axis. The cutting section when viewed in cross section comprises cutting edges integral to the tool for simultaneously removing the outside and inside burrs and for facing the flat cut edges of the piping, tubing or conduit.

Figure 1:
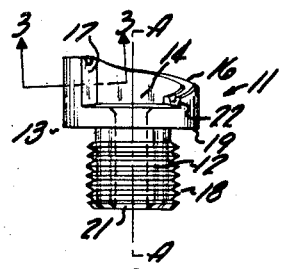
Figure 1A:
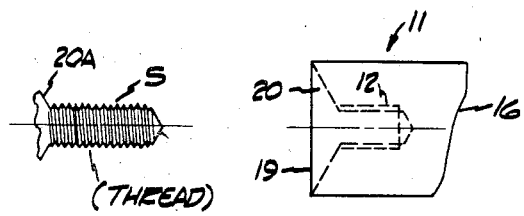

The above mentioned and other features of this invention and the manner of obtaining them will become more apparent, and the invention itself will be best understood by reference to the following description of an embodiment of the invention taken in conjunction with the accompanying drawings, in which:

FIG. 1 comprises a side view of an embodiment of the inventive chamfering tool;

FIG. 1a comprises a side view of another embodiment of the inventive chamfering tool and a spindle to which it may be mounted;

FIG. 2 comprises a front view of the embodiment of FIG. 1; and

Figure 3:

FIG. 3 is a sectional view of the cutting section of the inventive chamfering tool taken along a plane through lines 3—3 in the direction of the arrows in FIG. 1.

The pictorial view of FIG. 1 shows an embodiment of the inventive chamfering tool generally designated 11. The tool as shown, comprises a shank section 12 and a main body section 13. The surface 14 of the main body 13 is shown with a unitary helix-shaped cutting section 16 rising from surface 14. The cutting section, thus, is unitarily integral to the body 13. No coupling members are required to connect the cutting surfaces to the body. It should be understood that the invention in its broadest aspect is not limied to a helix-shaped cuting section. In fact, any cutting section which generates a circle when the tool rotates about its longitudinal (vertical in FIG. 1) axis would suffice. However, the helix shape is preferred since it enables repeated sharpening of the cutting section. Helix shaped as used here, means arcuate and continually rising from the surface of the main body 13 to the leading face 17 of cutting section 16. To sharpen the cutting section, it is only necessary to grind the tool at the leading face 17 of the helix-shaped cutting section 16.

Means are provided for facilitating the effective centering and locating of the tool relative to the piping, tubing, or conduit to be processed. More specifically, shank 12 is shown having an outer thread 18. The thread is used to insert the tool 11 into a holding block located in an arbor for example. The tool is threaded into the block until the surface 19 is juxtaposed and completely contiguous to the block. Thus, no special skill is required to properly locate and center the tool.

It should be understood that the shank 12 could comprise a smooth cylindrical or conical surface adapted to be held directly in an arbor. FIG. 1a illustrates the broadness of this aspect of the invention. In FIG. 1a, a female thread is used and the inventive tool can thus be mounted directly to the spindle of the tool machine. The surface 19 is still used for locating against the holder.

In greater detail, with regard to the embodiment of FIG. 1a, the thread 18 matches the external or male thread of the spindles. In fact, the tapered ends 20 of the internal thread match and lock to the tapered ends of spindle 20a of FIG. 1a.

As best seen in FIG. 2, a hex-shaped internal hole 21 extends through tool 11. The hex-shaped hole 21 concentric with the longitudinal axis A—A of the tool, is used to receive an Allen wrench for use in mounting the inventive chamfering tool on the tool machine. Thus, the tool would be threaded by hand into a block, or directly to the spindle. The tool would be tightened in place to assure the proper locating of the tool relative to the work piece (piping, tubing or conduit, for example) with the aid of an Allen wrench fitted into hole 21.

Here again, it should be understood that hex-shaped hole is shown by way of example. Other means, such as flat sections on opposite sides of the main body section 13 could be used for receiving wrench jaws. In such a case, a wrench, would, of course, be used for tightening the tool to assure proper location.

FIG. 2 best shows the arcuate shape of cutting section 16 as it rises from surface 14. While the cutting section 16 is shown peripherally disposed, it could, of course, rise from anywhere on face 14 that is removed from longitudinal axis A—A. In practice, the center of the cutting section 16 is disposed from the longitudinal axis a distance equal to the radii measured from the longitudinal axis to the center of its outer walls of the work pieces (piping, tubing or conduit) to be machined to the center of its outer walls. Thus, for example, if the inventive tool would rotate about its longitudinal axis, it would generate a circular section matching the circular section of the work piece.

An advantage of the arcuate shape of the cutting section having substantially equal radial distances from the longitudinal axis throughout its length is that it can be continuously sharpened and still be used on the same size work piece while located in the same relative position.

The highest point of the cutting section is at its leading face 17. This is the cutting face. To sharpen the tool, it is only necessary to grind face 17. The height of cutting section 16 continuously diminishes from its high point at face 17 until the cutting section ends at 22.

As best seen in FIG. 3, the cutting section 16 is generally trough-shaped at the top. More specifically, the top of the cutting section has two walls 23, 24. The walls are spaced apart at the tops thereof a distance that is greater than the thickness of the piping, tubing or conduit that is to be dressed. The inner faces 26, 27 of the walls 23, 24 are shown in the illustrated embodiment of the invention converging toward each other. A flat section 28 substantially parallel to the tops of the walls 23, 24 provides the bottom of the trough-like section. It joins the two walls 23, 24 at the bottoms of converging inner faces 26, 27. Thus, the inner faces 26, 27 simultaneously chamfers and deburs the interior and exterior burr left on the piping, tubing or conduit being finished while the flat bottom 28 smooths the face of the cut end of the piping, tubing or conduit.

In use, the illustrated embodiment of the inventive chamfering tool 11 is mounted on a tool machine by screwing into a threaded hole in a block mounted on the machine, taking advantage of the threads 18 on shank 21. The tool is tightened into place using an Allen wrench. When the rear face 19 of front section 13 is contiguously juxtaposed to the block, the tool machine operation is commenced. The work piece is fed toward the tool until the top of leading face 17 is juxtaposed to the wall of the work piece being finished. The relative rotation of the tool and the work piece results in the cutting section of the tool travelling completely around the wall of the work piece trimming and deburring as it travels. Thus, the inventive tool requires no adjustment and replaces three tools each requiring adjustment.

While the principles of the invention have been described above in connection with specific apparatus and applications, it is to be understood that this description is made only by way of example and not as a limitation on the scope of the invention.

We claim:

1. A chamfering tool for dressing piping, tubing, or conduit, said chamfering tool comprising a main body section, means for mounting said tool to a tool machine, said main body section having a surface facing the piping, tubing or conduit when said chamfering tool is mounted in said tool machine, cutting section means unitarily integral to and protruding from said surface, said cutting section located on said surface to coincide with the walls of said piping, tubing, or conduit, said cutting section comprising a pair of arcuate radially spaced cooperating walls that converge toward each other and said surface and extend along an axial helix, and said walls being spaced apart at the free ends thereof a distance greater than the thickness of the walls of said piping, tubing or conduit.

2. The chamfering tool of claim 1 wherein said converging surfaces terminate in a flat section substantially parallel to the tops of the walls.

3. The chamfering tool of claim 1 wherein said cutting section is peripherally disposed on said surface.

4. The chamfering tool of claim 1 wherein said mounting means comprises a shank section.

5. The chamfering tool of claim 4 wherein said shank section is threaded, and wherein said main body comprises a locating surface facing toward said threaded shank section.

6. The chamfering tool of claim 1 wherein said mounting means comprises an internal thread matching the external thread of a machine tool spindle.

7. The chamfering tool of claim 5 wherein said mounting means further comprise an internal aperture extending concentric with the longitudinal axis of said tool, and wherein said aperture is shaped to receive an Allen wrench.

8. The chamfering tool of claim 5 wherein said mounting means further comprises flat sections on said main body section for cooperating with wrench jaws.

References Cited

UNITED STATES PATENTS

| 2,188,584 | 1/1940 | Tyne | 77—73 |
| 2,470,392 | 5/1949 | Gassmann | 77—73 |
| 1,499,416 | 7/1924 | Stech | 77—73 |

FOREIGN PATENTS 120,702  11/1918  Great Britain.

FRANCIS S. HUSAR, *Primary Examiner.*